United States Patent [19]

Roine

[11] 4,437,629
[45] Mar. 20, 1984

[54] SEAT STRUCTURE HAVING AN ADJUSTABLE SEAT BACK AND SUPPORT SHELF ESPECIALLY FOR ACCOMMODATING PARACHUTE PACKS

[75] Inventor: Martin W. Roine, Federal Way, Wash.

[73] Assignee: The Boeing Company, Seattle, Wash.

[21] Appl. No.: 406,520

[22] Filed: Aug. 9, 1982

[51] Int. Cl.³ .............................................. B64D 11/06
[52] U.S. Cl. ................................ 244/122 R; 297/113; 297/284
[58] Field of Search ..................... 244/122 R; 297/112, 297/113, 284

[56] References Cited

U.S. PATENT DOCUMENTS

| | | | |
|---|---|---|---|
| 2,337,480 | 12/1943 | Logan | 297/113 |
| 2,700,412 | 1/1955 | Evans et al. | 244/122 R |
| 3,254,915 | 6/1966 | Mahaffey | 297/113 |

FOREIGN PATENT DOCUMENTS

| | | | |
|---|---|---|---|
| 1104277 | 11/1955 | France | 297/113 |
| 12550 | of 1903 | United Kingdom | 297/284 |
| 378351 | 4/1973 | U.S.S.R. | 244/122 R |

*Primary Examiner*—Galen L. Barefoot

*Attorney, Agent, or Firm*—Bernard A. Donahue; Ronald E. Suter; Steven W. Weinrieb

[57] ABSTRACT

A seat structure includes a flexible canvas seat bottom portion (14) and a flexible canvas seat back portion (12). A horizontally disposed, transversely extending beam member (58) is rotatably disposed above the seat bottom portion (14) and is operatively connected to the lower end of the seat back portion (12). The beam member (58) is movable between two positions 90° apart such that when the beam member (58) is disposed in its first position, the beam member (58) effectively defines a support shelf or platform projecting forwardly of the seat back portion (12) and is therefore capable of supporting parachute packs borne by parachuting personnel seated within the seat structure. The seat back portion (12) is also disposed in a slackened state at such time so as to accommodate the depth of the parachute packs. When the beam member (58) is moved to its second position, the seat back portion (12) attains a taut state so as to adequately support the upper back regions of the personnel devoid of their parachute packs, and the beam member (58) effectively disappears behind the seat back portion (12). Locking pins (68) engage apertures (66) defined within the beam brackets (60) for lockingly retaining the beam member (58) in either of its two positions.

15 Claims, 2 Drawing Figures

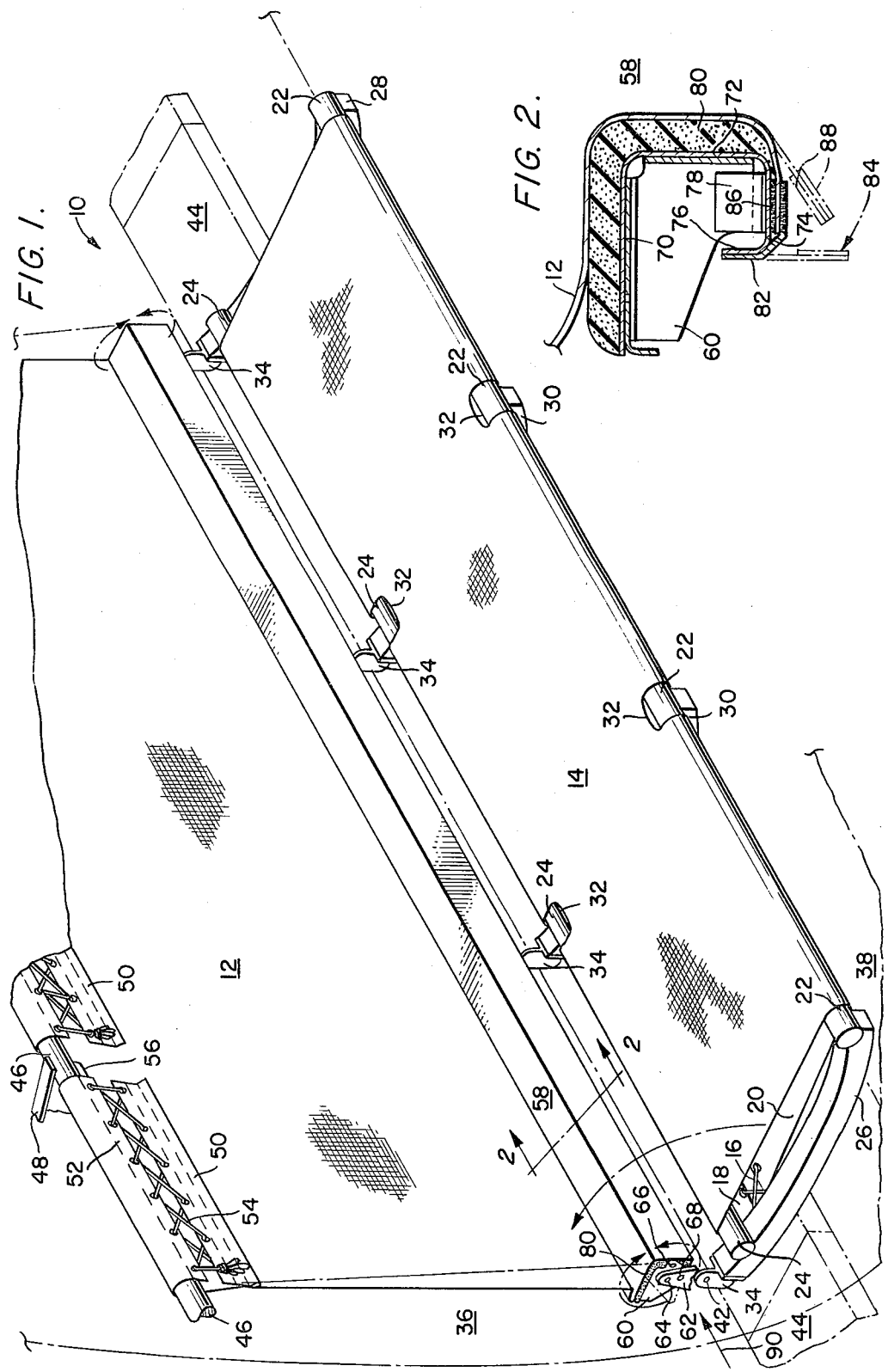

SEAT STRUCTURE HAVING AN ADJUSTABLE SEAT BACK AND SUPPORT SHELF ESPECIALLY FOR ACCOMMODATING PARACHUTE PACKS

TECHNICAL FIELD

The present invention relates generally to seat structures, and more particularly to a seat structure having a flexible back portion and a beam-type shelf member operatively associated therewith, wherein the back portion and the shelf member are both adjustably movable between first and second positions so as to comfortably accommodate, for example, both military and non-military personnel laden with parachute packs, and such personnel when not laden with their parachute packs, respectively.

BACKGROUND ART

Existing collapsible sidewall and centerline seat structures, such as, for example, those of the type generally disclosed within U.S. Pat. No. 2,700,412 issued to Robert B. Evans et al., and as may be found within military or non-military cargo and personnel transport aircraft, are conventionally provided with flexible back and seat bottom portions. The seat bottom portion often includes means for moving the same horizontally forwardly or outwardly away from or relative to the back portion of the seat structure so as to increase the seat bottom depth in order to accommodate a military paratrooper or civilian parachutist having a parachute pack secured upon his back.

When the paratrooper or parachutist is in fact seated within the seat structure, however, the parachute pack is nevertheless disposed a considerable distance above the seat bottom portion of the seat structure. Consequently, the weight load of the parachute pack must be borne solely by the paratrooper or parachutist, and more particularly by means of the shoulder regions of the paratrooper's or parachutist's body due to the structure of the parachute pack harness. This weight load becomes quite tiresome and burdensome after a considerable period of time, such as, for example, the time period extending from aircraft take-off to the parachuting drop point, and the parachute pack becomes quite uncomfortable to bear.

A need therefore exists for a seat structure which will comfortably accommodate military paratroopers or civilian parachutists when such personnel are laden with their parachute packs, or alternatively, when such personnel are seated within the seat structure devoid of their parachute packs. In particular, when such personnel are laden with their parachute pack loads, seat structure is needed which can support such loads and relieve the personnel per se from bearing such loads.

Accordingly, it is an object of the present invention to provide a new and improved seat structure.

Another object of the present invention is to provide a new and improved seat structure which is particularly adaptable for use by military paratroop or civilian parachutist personnel within aircraft carrying such personnel to, for example, a parachute drop location.

Still another object of the present invention is to provide a new and improved seat structure which will rectify the operational deficiencies of conventional seat structures presently disposed within parachute personnel drop aircraft.

Yet another object of the present invention is to provide a new and improved seat structure which is able to in fact comfortably accommodate military paratroop or civilian parachutist personnel when such personnel are either laden with a parachute pack load or not laden with a parachute pack load.

Still yet another object of the present invention is to provide a new and improved seat structure which is particularly adaptable for use by military paratroop or civilian parachutist personnel within aircraft carrying such personnel whereby, when such personnel are laden with their parachute pack loads, the seat structure of the present invention can adequately support such loads.

Yet still another object of the present invention is to provide a new and improved seat structure which is particularly adaptable for use by military paratroop or civilian parachutist personnel within aircraft carrying such personnel whereby, when such personnel are laden with their parachute pack loads, the seat structure of the present invention can relieve such loads from the shoulder regions of such personnel.

A further object of the present invention is to provide a new and improved seat structure which is convertible between two different modes or arrangements so as to in fact be capable of comfortably accommodating the military paratroop or civilian parachutist personnel when such personnel are either laden with their parachute packs or, alternatively, devoid of such parachute packs and the attendant loads.

A yet further object of the present invention is to provide a new and improved seat structure which is easily convertible between the two different operational modes or arrangements so as to be readily available for service in either one of the two different operational modes or arrangements for accommodating the personnel as may be required.

A still further object of the present invention is to provide a new and improved seat structure which, aside from the particularly unique novel improvements characteristic of the present invention as compared to conventional collapsible sidewall and centerline seat structures, the seat structure of the present invention is nevertheless operable, serviceable, and structured in a manner substantially similar to such conventional collapsible sidewall and centerline seat structures.

A yet still further object of the present invention is to provide a new and improved seat structure, the structural features and improvements of which may readily be applied to or incorporated within conventional collapsible sidewall and centerline aircraft seat structures in order to convert or modify the same, as may be desired or required, so as to be operable in the two modes exhibited by the improved seat structure of the present invention.

A still yet further object of the present invention is to provide a new and improved seat structure which is substantially simplified in structure and relatively inexpensive to manufacture.

DISCLOSURE OF THE INVENTION

The foregoing and other objectives of the present invention are achieved through the provision of a collapsible sidewall and centerline aircraft seat structure which comprises a flexible canvas seat back portion and a flexible canvas seat bottom portion, both canvas portions being easily secured or removed from their respective seat structural frameworks by lacing fastening means. The seat bottom structure is pivotable between a folded-up position, wherein the seat bottom is disposed substantially parallel to the seat back portion, and a folded-down position wherein the seat bottom is disposed substantially perpendicular to the seat back portion for supporting personnel in a sitting mode. The seat bottom portion is moved to its folded-up position when personnel are not in fact occupying the seat structure and when, for example, the aircraft is being utilized for cargo transport purposes. When the seat structure is disposed within this mode, the folded-up seat bottom portion also uncovers a walkway for providing walking access by suitable personnel throughout the interior of the aircraft alongside the interior sidewalls thereof.

Having established the particular structural environment with which the present invention is concerned, the present invention is seen to particularly comprise a beam member to which the flexible canvas seat back portion is fixedly secured. The beam has a substantially L-shaped configuration as viewed in cross-section thereby defining adjacent or contiguous horizontal and vertical surfaces. The beam is pivotably mounted upon bracket members fixedly secured to, or forming integral component parts of, the seat structure framework, and is movable between two fixed positions angularly disposed 90° apart. Locking pin mechanisms are provided upon the bracket members for fixedly locking or retaining the beam in either one of its two positions.

When the beam is disposed in what may be considered its first or paratrooper position, the flexible canvas seat back portion is disposed in a relaxed or slackened state and the beam member effectively projects forwardly of, or relative to, the slackened seat back portion. When the beam is disposed in this position, the long leg portion of the L-shaped beam is disposed in a substantially horizontal plane while the short leg portion of the beam is disposed in a forward, substantially vertical plane. In this manner, the beam member effectively defines, or serves as, a shelf means upon which a paratrooper's or parachutist's parachute pack may be placed and weight-supported when the paratrooper or parachutist is seated within the seat structure. The slackened seat back portion facilitates the weight-support function of the beam shelf by accommodating the depth or front-to-back thickness of the parachute pack whereby the bottom portion of the parachute pack may then be placed upon the horizontally disposed surface or leg of the beam shelf so as to permit the latter to effectively support the weight load of the parachute pack and thereby remove such a load or burden from the shoulder regions of the paratrooper or parachutist. As a result of the provision of the beam shelf or platform of the present invention, the paratrooper or parachutist personnel are relieved of considerable fatigue-inducing weight loads. In addition, it is also noted that when the beam shelf or platform member is disposed within this first positional mode, the vertically disposed short leg portion of the beam serves as a lumbar support means for the seated paratrooper or parachutist personnel.

In a similar manner, when the paratrooper or parachutist personnel do not have their parachute packs secured upon their backs, the pivotable beam member of the present invention may be pivoted in a clockwise direction from its first or paratrooper position to its second or standard-personnel position. In this positional mode, the flexible seat back portion of the seat structure is stretched taut so as to adequately support the unencumbered back torso regions of the personnel. The long leg portion of the beam which was previously disposed within the horizontal plane and supporting the parachute pack loads is now disposed in a forward vertical plane immediately to the rear of the lowermost portion of the flexible seat back portion, while the short leg portion of the beam member which was previously disposed within the forward vertical plane is now disposed in a lower horizontal plane. In effect, then, when the beam member is disposed in this positional mode, it has been effectively caused to have disappeared whereby the resulting seat structure resembles conventional collapsible sidewall and centerline aircraft seat structure.

The seat structural system of the present invention is thus seen to exhibit uniquely desirable functional properties in that the same is able to comfortably accommodate military paratroop or civilian parachutist personnel bearing parachute pack loads, as well as such personnel or similar personnel not bearing such loads. In addition, the seat structure of the present invention is capable of operating in substantially all respects or modes as do conventional collapsible sidewall and centerline aircraft seats.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIG. 1 is a perspective view of a collapsible sidewall and centerline aircraft seat structure showing the new and improved adjustable seat back and support shelf or platform, and the pertinent component parts thereof, characteristic of the present invention; and FIG. 2 is a cross-sectional view of the beam member of the new and improved seat structure of the present invention as disclosed in FIG. 1 and as taken along line 2—2 of FIG. 1, the beam member defining the support shelf or platform, and this Figure illustrating in detail the attachment of the flexible seat back portion of the seat structure to the beam member.

BEST MODE FOR CARRYING OUT THE INVENTION

Referring now to the drawings, and more particularly to FIG. 1 thereof, the new and improved collapsible sidewall and centerline aircraft seat structure of the present invention is shown and generally designated by the reference character 10. It will initially be appreciated that the seat structure of the present invention is substantially similar to that represented and disclosed within U.S. Pat. No. 2,700,412 issued to Robert B. Evans et al. in that the seat structure of the present invention comprises a flexible canvas seat back portion 12 and a flexible canvas seat bottom portion 14.

The flexible seat bottom portion 14 is provided with lacing fastening means 16 whereby the oppositely disposed mating ends 18 and 20 of the canvas sheet or strip defining the seat bottom portion 14 may be secured together. In particular, it is seen that the seat bottom portion 14 is secured upon a seat bottom framework, which comprises forward and rearward, transversely extending parallel rail members 22 and 24, respectively, by being wrapped about the rail members 22 and 24 so as to, in effect, form an endless canvas strip or sheet when the ends 18 and 20 thereof are secured together by the lacing fastening means 16. The seat bottom framework also includes side rail members 26 and 28, and a plurality of transversely spaced rail members 30 interposed between, and disposed parallel to, side rail members 26 and 28. The side rail members 26 and 28, and the intermediate rail members 30, all extend between, in the depth-wise direction of the seat, the forward and rearward rail members 22 and 24 so as to structurally interconnect the members 22 and 24 together.

The width of the canvas seat bottom 14 is just slightly less than the distance defined between the inner side surfaces of the side rail members 26 and 28. The canvas seat portion 14 is also provided with cut-out portions 32 which extend in the depth-wise direction of the seat bottom parallel to the intermediate rail members 30. The cut-out portions 32 are disposed within the vicinity of the forward and rearward transversely extending rail members 22 and 24, and upon the underside portion of the seat bottom 14, at transversely spaced loci which correspond to the locations of the intermediate rail members 30. In this manner, the intermediate members 30 are effectively accommodated by the canvas seat bottom portion 14 when the seat bottom portion 14 is to be fastened upon the seat bottom framework.

Lastly with respect to the seat bottom portion 14 and its structural framework, the rear end of each of the side rail members 26 and 28, as well as the rear end of each of the intermediate rail members 30, is provided with suitable bracket means 34 fixedly secured thereto. The brackets 34 are, in turn, pivotably secured to fixed support means, not shown, provided, for example, upon either the interior wall surface 36 or the cargo floor surface 38 of the aircraft fuselage, the latter two surfaces being shown merely in phantom lines for reference purposes only. The pivotal axis for the seat bottom framework brackets 34 is shown at 42, and in this manner, the entire seat bottom structure may be pivoted upwardly so as to be disposed essentially parallel to the seat back portion 12. When the seat bottom portion 14 is disposed in this upward stowed position, a personnel walkway 44, suitably secured to structural means, not shown, included in the fuselage sidewall 36, is uncovered. The walkway 44, also shown only in phantom lines for reference purposes only, is normally disposed at an elevation beneath the seat bottom portion 14 yet above the fuselage floor 38, and is utilized as a personnel walk-path when the aircraft is loaded with cargo.

The flexible canvas seat back portion 12 of the seat structure of the present invention is likewise adapted to be removably secured upon a seat back framework in a manner somewhat similar to the removable lace-fastening system characterizing the seat bottom portion 14. In particular, the seat back framework includes an upper rail member 46 fixedly secured to suitable support brackets 48 which are, in turn, fixedly secured to the support structure, not shown, comprising the sidewall structure 36 of the aircraft fuselage. Auxiliary mounting or fastening strips 50 are secured to the upper portion of the canvas seat back portion 12 upon the interior surface thereof by, for example, stitch fastening means. The auxiliary fastening strips 50 are secured to the seat back portion 12 at an elevational level below the horizontally disposed, transversely extending upper framework rail member 46, and before the terminal edge portion 52 of seat back 12. The terminal edge portion 52 of seat back 12 is then continued upwardly, wrapped about upper rail member 46, and disposed in a dependent, downwardly extending mode so as to be mated with the auxiliary fastening strips 50 by means of lace fastening means 54. Cut-out portions 56 are provided within the upper portion or region of seat back 12, and within the vicinity of support brackets 48, so as to accommodate the brackets 48 when the canvas seat back 12 is in fact fastened upon the upper rail member 46.

With particular reference now being made to FIGS. 1 and 2, it will be seen that the lower end of flexible canvas seat back portion 12 is operatively secured to a rotatable, horizontally disposed, transversely extending beam member 58. Each side end of the beam member 58 is provided with a substantially triangularly configured mounting bracket 60. The mounting brackets 60 are pivotably mounted upon fixed brackets 62 which may be vertically upward extensions of the support means, not shown, for the endmost brackets 34 of side rails 26 and 28, or alternatively, may comprise separate bracket means suitably secured to the structural system comprising the side wall 36 or the floor 38 of the aircraft fuselage. The pivotal axis of the brackets 60 relative to brackets 62 is shown at 64, and the beam member 58 is pivotable or rotatable between two positions disposed 90° apart. Each bracket 60 is provided with two apertures 66, only one of which is shown, and each bracket 62 is provided with, for example, a spring-biased locking pin mechanism 68 adapted to engage one of the apertures 66 of the brackets 60 so as to lock the beam member 58 in either one of its two positions.

As may best be appreciated from FIG. 2, the beam member 58 per se is substantially L-shaped in cross-sectional configuration. As disclosed in both FIGS. 1 and 2, the beam member 58 is disposed in its first or paratrooper position such that the reinforced long leg 70 of the beam channel defining the beam member 58 is horizontally disposed, while the reinforced short leg 72 of the beam channel is vertically disposed. Leg 72 extends downwardly beneath the lower edge of bracket 60 and has a horizontally disposed auxiliary portion 74 which extends parallel to long leg 70. In turn, the left end of auxiliary portion 74 is provided with an upstanding terminal end portion 76 which is disposed parallel to short leg 72. An L-shaped bracket 78 is fixedly secured between triangular beam bracket 60 and the auxiliary beam channel portion 74 such that the latter does not extend in an unsupported cantilevered mode.

Foam rubber padding 80 is fixedly secured, for example, by suitable adhesive means, to the exterior surfaces of the beam channel legs 70 and 72 for personnel comfort and noise-reduction purposes as will become apparent hereinafter. In order to secure the lower end of flexible canvas seat back portion 12 to the rotatable beam member 58, an auxiliary or doubler canvas strip 82 is adhesively secured to the terminal end 76 of the beam channel, and a strip of VELCRO 84 is attached to the interior surface thereof, as shown in phantom lines. In a similar manner, a strip of VELCRO 86 is secured to the lower or undersurface of beam channel auxiliary portion 74. Lastly, VELCRO strips 88 are secured to both sides of the lower terminal end of flexible canvas seat back portion 12. In securing the lower terminal end of the seat back 12 to the beam member 58, it is therefore appreciated that the inner VELCRO strip 88 of seat back 12 is mated with VELCRO strip 86 while the outer VELCRO strip 88 of seat back 12 is mated with VELCRO strip 84 of the doubler canvas 82. In this manner, the lower terminal end of canvas seat back 12 is sandwiched between the doubler canvas 82 and the beam channel portion 74 so as to in fact be securely fastened to the beam member 58.

In operation, when the beam member 58 is disposed within its first or paratrooper position as shown in FIGS. 1 and 2, it is seen that the flexible canvas seat back portion 12 has attained a slackened condition or state and the beam member 58 effectively projects forwardly of the seat back 12. In this manner, the horizontally disposed, reinforced portion 70 of the beam member 58 effectively serves as a shelf or platform upon which the parachute pack of the paratrooper or parachutist may be disposed and supported. This support of the parachute load by means of the beam shelf or platform section 70 relieves the load weight forces of the parachute pack from the parachuting personnel. The slackened condition or state of the seat back portion 12 provides the required depth to the seat back of the seat structure relative to the seat bottom 14 so as to in fact comfortably accommodate the parachute pack when the parachutist or paratrooper is seated within the seat structure of the present invention. The foam-padded portion 70 of the beam member permits the parachute pack to be placed upon the beam shelf or platform with minimal generation of noise, while the foam-padded portion 72 of the beam member provides a comfortable lumbar back support means for the personnel when seated.

When it is desired to move the beam member from its first or paratrooper position shown in FIGS. 1 and 2 in solid lines, to its second or non-paratrooper position partially shown by phantom lines for brackets 60 in FIG. 1, locking pin mechanisms 68 are withdrawn from the first ones of apertures 66, the beam member 58 is rotated 90° in the clockwise direction as viewed from the direction of arrow 90, and the locking pin mechanisms 68 are operatively disposed within the second holes or apertures 66. In this state, as seen by the phantom lines for seat back portion 12, the seat back 12 is now disposed in a tensioned or taut condition or state, and the beam member, along with its support shelf, has effectively disappeared behind seat back portion 12. The beam channel portion 70 is now disposed within a vertical plane while the beam channel portion 72 is now disposed within a lower horizontal plane. The foam-padded channel portion 70 can also now serve as a comfortable lumbar support means for the non-paratrooper personnel while the upper regions of the personnel backs are adequately supported by the substantially rigid or taut seat back portion 12.

Thus, it may be seen that the seat structure of the present invention has important advantages over known collapsible sidewall and centerline aircraft seat structures in that paratrooper or parachutist personnel carrying parachute packs can be comfortably accommodated while their parachute pack loads adequately supported when the personnel are seated within the seat structure of the present invention. In addition, paratrooper or parachutist personnel not bearing parachute pack loads, or other non-parachuting personnel, can likewise be comfortably accommodated within the seat structure of the present invention by simply disposing the beam shelf or platform member to its appropriate mode position.

Obviously, many modifications and variations of the present invention are possible in light of the above teachings. It is therefore to be understood that within the scope of the appended claims, the present invention may be practiced otherwise than as specifically described herein.

I claim:

1. Seat structure, comprising:
    a seat bottom portion;
    a seat back portion; and
    means movable between first and second positions, and operatively connected to said seat back portion along the lower edge portion of said seat back portion, for serving as a support platform projecting forwardly of said seat back portion when said means is disposed in said first position and said seat back portion is disposed in its seat back mode, and disappearing behind said seat back portion when said means is disposed in said second position and said seat back portion is disposed in its seat back mode.

2. Seat structure as set forth in claim 1, wherein:
    said seat back portion is formed from flexible canvas material whereby when said means is disposed in said first position, said seat back portion is disposed in a slackened state while when said means is disposed in said second position, said seat back portion is disposed in a taut condition.

3. Seat structure as set forth in claim 1, wherein:
    said means comprises a substantially L-shaped beam member.

4. Seat structure as set forth in claim 1, wherein:
    said means is pivotably movable between said first and second positions.

5. Seat structure as set forth in claim 4, wherein:
    said first and second positions are disposed 90° apart.

6. Seat structure as set forth in claim 1, further comprising:
    means for locking said means in both said first and second positions.

7. Seat structure as set forth in claim 6, wherein said locking means comprises:
    bracket means fixedly secured to said seat structure;
    bracket means fixedly secured upon said movable means;
    spring-biased locking pins operatively mounted upon said seat structure bracket means; and
    means defining apertures within said movable means bracket means, for accommodating said locking pins, and corresponding to said first and second positions.

8. Seat structure as set forth in claim 3, further comprising:
    foam padding secured to said beam member for providing a padded lumbar support means for a person seated within said seat structure when said beam member is disposed in either its first or second position.

9. Seat structure as set forth in claim 1, wherein:
    said seat structure is included within aircraft collapsible sidewall and centerline seats.

10. Seat structure as set forth in claim 1 wherein:
    said seat back portion is connected to said movable means by VELCRO fasteners.

11. Seat structure as set forth in claim 1, wherein:
    said movable means is disposed at an elevational level above said seat bottom portion.

12. Seat structure as set forth in claim 3, wherein:
    said beam member is disposed in a substantially horizontal transverse plane.

13. Seat structure as set forth in claim 1, wherein:

said movable means is connected to the bottom end region of said seat back portion.

14. Seat structure as set forth in claim 13, wherein:

said movable means comprises a substantially L-shaped beam member; and said bottom end region of said seat back portion is connected to said beam member by being wrapped about the leg portions of said beam member comprising said L-shaped configuration.

15. Seat structure incorporated within aircraft collapsible sidewall and centerline seats which may be utilized either by parachuting personnel bearing parachute packs, or alternatively, by such personnel devoid of said parachute packs, comprising:

a seat bottom portion;

a flexible seat back portion; and means movable between first and second positions, and operatively connected to said flexible seat back portion, for serving as a support platform projecting forwardly of said seat back portion so as to support said parachute packs and for causing said flexible seat back portion to attain a slackened state so as to accommodate the depth of said parachute packs when said movable means is disposed in said first position, and for causing said flexible seat back portion to attain a taut state so as to adequately support the upper back body regions of said personnel when said personnel are devoid of said parachute packs, wherein said movable means has also disappeared behind said flexible seat back portion, when said movable means is disposed in said second position.

* * * * *